United States Patent [19]

Sedlaczek et al.

[11] 4,240,668
[45] Dec. 23, 1980

[54] DRIVING DEVICE FOR MINING MACHINE

[75] Inventors: Janusz Sedlaczek, Gliwice; Andrzej Błażewicz, Tychy; Marian Krutki, Katowice; Kazimierz Mandat, Katowice; Tadeusz Wozniak, Katowice, all of Poland

[73] Assignee: Centralny Osrodek Projektowokonstrukcyjny Maszyn Gorniczych "Komag", Gliwice, Poland

[21] Appl. No.: 11,884

[22] Filed: Feb. 13, 1979

[30] Foreign Application Priority Data

Feb. 22, 1978 [PL] Poland .................................. 204808

[51] Int. Cl.³ .............................................. E21C 29/02
[52] U.S. Cl. .................................. 299/43; 105/29 R; 474/155
[58] Field of Search ................. 299/43, 43; 74/243 R; 105/29 R

[56] References Cited

U.S. PATENT DOCUMENTS

| 2,757,784 | 8/1956 | Von Stroh et al. ............... 74/243 R |
| 4,006,937 | 2/1977 | Curtis ................................... 299/43 |

FOREIGN PATENT DOCUMENTS

| 93531 | 12/1977 | Poland . | |
| 1198473 | 7/1970 | United Kingdom ................. | 74/243 R |

Primary Examiner—Ernest R. Purser
Attorney, Agent, or Firm—Haseltine, Lake & Waters

[57] ABSTRACT

A driving device for a mining machine comprising an endless link chain extended on a drive wheel, a reversible wheel and a plurality of directing wheels and cooperating with a rack fixed alongside the conveyor. The directing wheels are each composed of two toothed rings separated by a circumferential groove. The outline of the teeth of the wheels is formed of sections of the sides of a regular polygon circumscribed on a circle, the tips of the teeth being truncated. In the intertooth spaces the wheel is provided with recesses below the pitch circle. The links of the chain lying in a plane parallel to the axis of the wheel seat on the flanks of two neighboring teeth, whereas the links lying in a plane perpendicular to the axis are seated in the circumferential groove. The reversible wheel has a shape identical to that of the directing wheels.

2 Claims, 2 Drawing Figures

DRIVING DEVICE FOR MINING MACHINE

FIELD OF THE INVENTION

The invention relates to a driving device for a mining machine advancing on a conveyor, especially for driving a combine.

PRIOR ART

A driving device for a mining machine, especially for driving a combine advancing on a longwall conveyor, is known from Polish patent application No. P.1777758. The device is mounted on a combine and it consists of a drive chain-wheel, a reversible wheel, and directing wheels. The aforesaid wheels are fixed to the combine. On the wheels an endless link chain is wound, one section of which is situated parallel to the conveyor and supported in such position by a deflecting block, i.e. by a sliding skid. The section of the chain which is supported by the deflecting block meshes with a rack situated alongside of the conveyor on one of the shelves of the conveyor, the teeth being shaped so that they can co-operate with the link chain. The drive wheel and the directing wheels are toothed, their teeth being fitted for co-operation with the link chain. The drive wheel which is driven by the motor of the combine, causes the link chain to rewind over the reversible wheel and the directing wheels, whereas the section of the chain, which co-operates with the rack fixed alongside of the conveyor, makes the combine advance along the conveyor, similar to crawlers. The reversible wheel and the directing wheels co-operate with the link chain and therefore they are provided with teeth fitted for co-operation with the links of the chain. Said teeth form rounded seats in which every second link of the chain seats with its plane tangent to the pitch circle. The links of the chain, which are set perpendicularly to the surface of the wheel, are placed in the middle groove encircling the wheel.

A disadvantage of the known device consists in an irregular rolling of the chain over the wheels, which causes jerks in the system. The jerks result from the fact that link chains have irregular link pitch, and the irregularity of the pitch increases during use, because of lengthening of the links. This causes momentary stresses of the chain in the section between two neighboring wheels, and then the tension is abruptly released—when the wheel is entered by a link of a different pitch. The more there are chain wheels within the chain circuit, the more intense is the phenomenon of jerking.

SUMMARY OF THE INVENTION

An object of the invention is to provide a device free from jerks occurring in the chain which causes irregular operation of the winning machine.

The aforesaid object has been achieved by shaping the teeth of the directing wheels to enable a relative displacement of the chain links over the teeth flanks of the directing wheel. The directing wheel has two toothed rings separated by a groove. The outline of the toothed ring is formed of sections of the sides of a regular polygon circumscribed on a circle whose radius is smaller by half the thickness of the chain link than the radius of the pitch circle. The tips of the teeth are truncated, and in the inter-tooth spaces the wheel has recesses below the pitch circle. The adhering flanks of two neighboring teeth form one plane, and a chain link rests with one end of the flank of one tooth, and with the other end on the flank of the neighboring tooth. The chain links situated in the plane perpendicular to the axis of the wheel are located in a groove between the toothed rings.

Due to such shape of the chain wheel, which can be used in the device either as a directing wheel or as a reversible wheel, the jerks are eliminated, which jerks occur in the chain and cause dynamic loads in the mechanisms of the driving device and in other mechanisms of the combine, as well as strikings of the mining unit on the body of coal, and strikings in the rack. Additionally, the chain wheel according to the invention, which does not perform the function of a drive wheel of a chain, is less complicated in its shape, and therefore is easier to be manufactured, especially as regards the maintenance of the tooth pitch tolerance.

BRIEF DESCRIPTION OF THE DRAWING

An embodiment of the invention is illustrated in the drawing in which.

DETAILED DESCRIPTION

Figure 1:
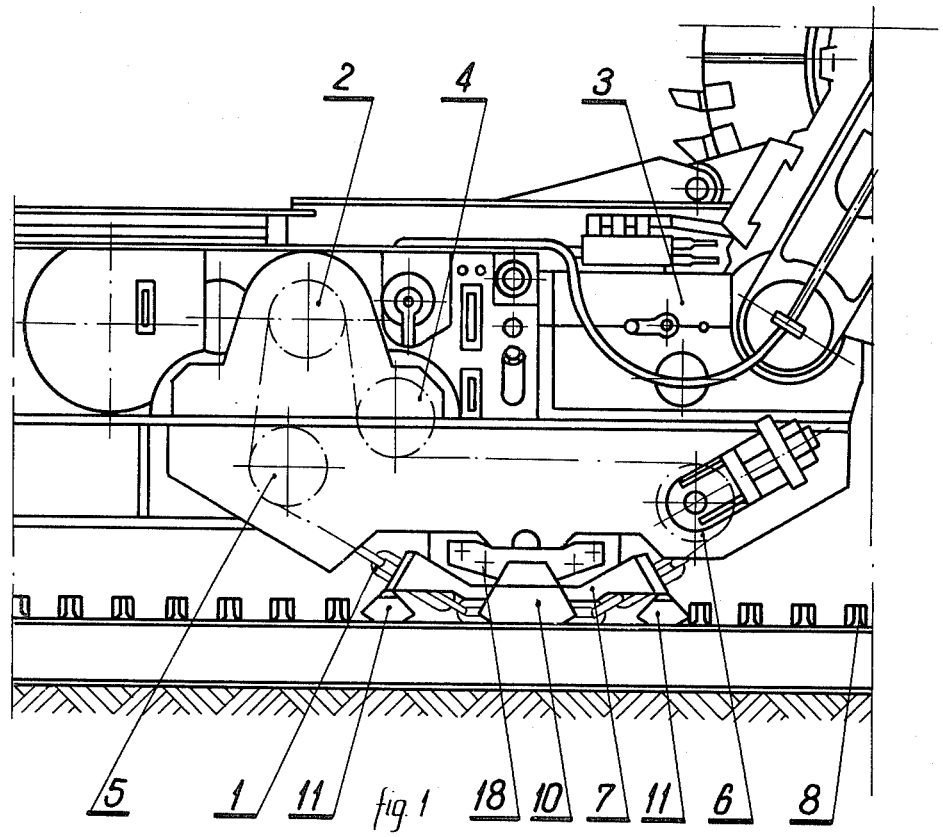
FIG. 1 is a side view of the device.
Figure 2:
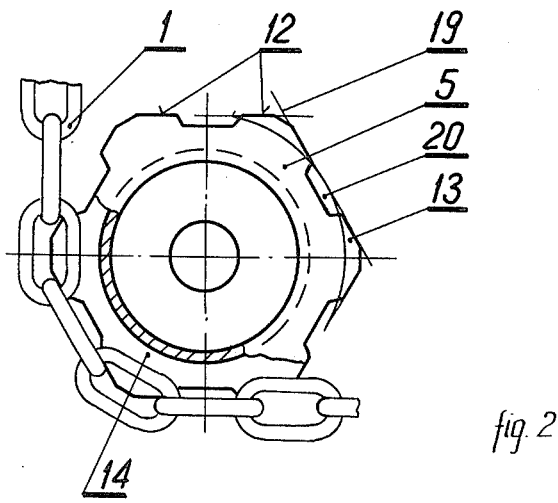
FIG. 2 is a side view, with a partial pass, of the directing wheel.

In a combine 3 a drive wheel 2 and a reversible wheel 6 are mounted. Between them a link chain 1 runs whose direction is controlled by directing wheels 4 and 5. On a certain section the link chain 1 slides over a deflecting block 7 whose surface is parallel to a rack 8. The deflecting block 7 is fixed self-aligningly by means of a pin 18 to the combine 3. Additionally, the deflecting block 7 is provided with a plate 10 securing the combine 3 against crosswise displacement in relation to the rack 8. The link chain 1, in the region of the deflecting block 7 is in mesh with the teeth 8 forming the rack which is situated alongside of the conveyor. Moreover, the device is provided with scrapers 11 removing fine coal from the rack 8 of the conveyor. The directing wheels 4 and 5 are provided with two toothed rings separated by a circumferential groove 14. The outline of the teeth of the directing wheels 4 and 5 are formed of sections 12 of the sides of a regular polygon circumscribed on a circle 13 whose radius is smaller by half the thickness of the chain link than the radius of the pitch circle. The tips 19 of the teeth are truncated. In the inter-tooth spaces a recess 20 is provided below the pitch circle. The links of the chain 1, situated in a plane parallel to the axis of the wheel set on the flanks 12 of the two neighboring teeth, whereas the links of the chain 1 situated in the planes perpendicular to the axis of the wheel set in the groove 14. The drive wheel 2 driven by means of a motor causes a displacement of the link chain 1 directed by the directing wheels 4 and 5 and the reversible wheel 6. The link chain 1, when leaving the reversible wheel 6, passes onto the deflecting block 7 and it is in this part that it meshes with the rack 8. Then the link chain 1 disengages from the rack 8 and travels onto the directing wheel 5, and then onto the drive wheel 2. As a result, the combine 3 advances along the rack 8 due to the fact that the link chain operates similar to the crawler chains of crawlers.

What is claimed is:

1. In a device for driving a mining machine advancing along a conveyor, comprising an endless link chain extended on a drive wheel, a reversible wheel and a plurality of directing wheels, each directing wheel including two toothed rings separated by a circumferential groove, and a rack fixed alongise the conveyor for separatively engaging said chain, the improvement wherein the teeth of the rings of the directing wheels have a shape formed of segments of sides of a regular polygon circumscribed on a circle, said polygon-shaped teeth constituting the outer outline of the directing wheels, said teeth defining a pitch circle whose radius is less than said radius of the circle circumscribing the polygon, said teeth having tips which are truncated, said directing wheels having inter-tooth spaces and being provided with recesses in said inter-tooth spaces below said pitch circle, the links of the chain which lie in a plane parallel to the axis of rotation of said wheel seating on the flanks of two neighboring teeth, whereas the links lying in a plane perpendicular to the axis of said wheel seat partially in said circumferential groove.

2. A device as claimed in claim 1 wherein the magnitude of the difference between the radius of the circle circumscribing the polygon and the pitch circle is equal to one half the thickness of the chain link.

* * * * *